(12) United States Patent
Maroni et al.

(10) Patent No.: US 8,184,758 B2
(45) Date of Patent: May 22, 2012

(54) METHOD AND APPARATUS FOR DETECTING ELECTRICAL IDLE

(75) Inventors: Peter D. Maroni, Fort Collins, CO (US); Justin A. Coppin, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 12/335,705

(22) Filed: Dec. 16, 2008

(65) Prior Publication Data

US 2010/0153589 A1 Jun. 17, 2010

(51) Int. Cl.
*H04L 7/02* (2006.01)
*G06F 1/32* (2006.01)
(52) U.S. Cl. ............. 375/359; 710/14; 710/18; 713/323
(58) Field of Classification Search .................. 370/465, 370/503, 466; 375/357, 359; 710/14, 18; 713/323
See application file for complete search history.

(56) References Cited

U.S. PATENT DOCUMENTS

| | | | |
|---|---|---|---|
| 2005/0154946 A1* | 7/2005 | Mitbander et al. ............. | 714/724 |
| 2006/0117125 A1* | 6/2006 | Tseng ............................ | 710/301 |
| 2007/0036082 A1* | 2/2007 | Sonksen et al. ............... | 370/242 |
| 2007/0041455 A1* | 2/2007 | Tran et al. ..................... | 375/257 |
| 2007/0150762 A1* | 6/2007 | Sharma et al. ................ | 713/300 |
| 2007/0180281 A1* | 8/2007 | Partovi et al. ................. | 713/320 |
| 2008/0001632 A1* | 1/2008 | Lee et al. ........................ | 326/83 |
| 2008/0178052 A1* | 7/2008 | Das Sharma .................. | 714/712 |
| 2008/0233912 A1* | 9/2008 | Hunsaker et al. ............. | 455/219 |
| 2009/0106636 A1* | 4/2009 | Jenkins et al. ................ | 714/804 |
| 2009/0279887 A1* | 11/2009 | Xia et al. ........................ | 398/34 |
| 2009/0323722 A1* | 12/2009 | Sharma ......................... | 370/470 |
| 2011/0022750 A1* | 1/2011 | Sobelman ...................... | 710/100 |

* cited by examiner

*Primary Examiner* — Andrew Lee

(57) ABSTRACT

A system and method for detecting electrical idle in a receiver is disclosed herein. A receiver includes a differential receiver, an analog idle detector, and a first filter. The differential receiver receives a variable rate differential signal. The analog idle detector is coupled to the differential receiver. The analog idle detector provides a first idle signal that erroneously identifies a differential signal electrical idle state. The first filter is coupled to the analog idle detector. The first filter processes the first idle signal and generates a second idle signal lacking the idle state errors of the first idle signal. The first filter provides the second idle signal to receiver control logic that controls signal reception.

15 Claims, 3 Drawing Sheets

METHOD AND APPARATUS FOR DETECTING ELECTRICAL IDLE

BACKGROUND

Over the years, various standards have been applied to permit connection of peripheral devices (i.e., peripheral expansion boards) to a computer mainboard. Parallel bus standards, such as Industry Standard Architecture ("ISA"), Extended ISA ("EISA"), Micro Channel Architecture ("MCA"), Video Electronics Standards Association Local Bus ("VLB"), Accelerated Graphics Port ("AGP"), and Peripheral Component Interconnect ("PCI") specified the computer expansion buses predominately used at various times in the recent past.

As computing speeds and input/output requirements increased, the disadvantages of parallel buses became apparent. The large number of conductors and the space required by the conductors make parallel buses costly. The transfer rate of parallel buses is limited by the skew (the delay differences) of the different signal paths.

To overcome these, and other, problems presented by parallel bus solutions, the computer industry has developed and implemented serial interconnect standards. The fewer conductors used by serial interconnect schemes lowers system cost by reducing board, cable, and connector size. By reducing the number of signal paths, serial interfaces allow for an increase in transmission rates that compensate for the reduced width of the serial data path.

Peripheral Component Interconnect Express ("PCI Express" or "PCIe") is a serial interconnect standard designed to replace various parallel bus standards (e.g., PCI, AGP, etc.) in computer systems. PCIe provides a point-to-point topology wherein each device can have a dedicated connection to each other device through a crossbar switch. A dedicated connection between two devices is termed a link. A link is composed of up to 32 lanes. A lane is a full-duplex communication path made up of two differential pairs, each differential pair carrying data in one direction.

The first generation PCIe specification ("PCIe 1.X") provides for data transfers at 2.5 giga-bits per second ("Gb/s") per lane. The second generation PCIe specification ("PCIe 2.X") provides for double the rate of the first generation specification, i.e., 5 Gb/s per lane. Aggregating multiple lanes in a link increases the available data rate in accordance with the number of lanes. While PCIe 2.0 maintains backward compatibility with PCIe 1.0, allowing use of PCIe 1.0 devices in a PCIe 2.0 system, the difference in data rates employed under the two specifications creates a variety issues. Methods of improving the level of compatibility between different PCIe generations is desirable.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
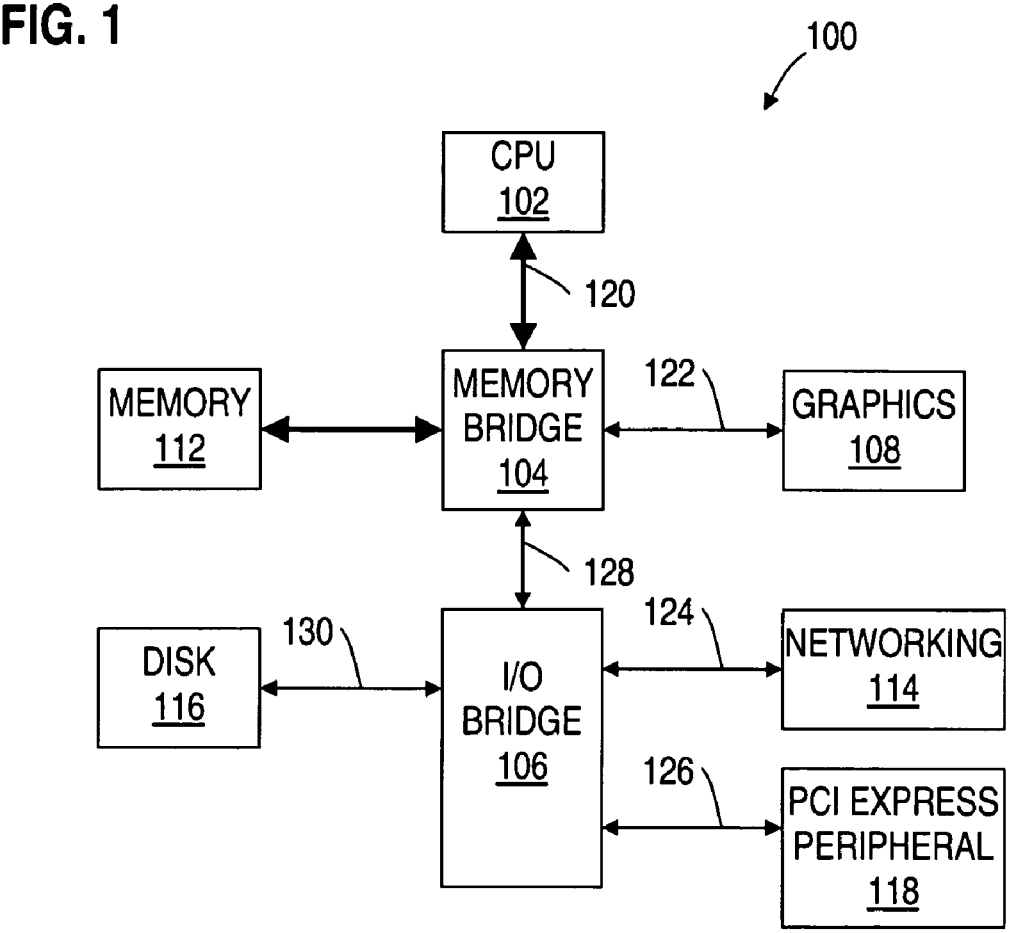
FIG. 1 shows a system that includes devices employing PCI Express ("PCIe") with electrical idle and non-idle detection in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in non-volatile memory, and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

An apparatus and method for determining whether a differential signal provided to a receiver is in an idle or non-idle state are disclosed herein. Devices based on the Peripheral Component Interconnect ("PCI®") Express ("PCI Express®" or "PCIe®") specification include, in the receiver, an analog circuit for detecting whether a differential signal indicates an electrical idle state. The PCIe specification requires that a receiver differential voltage greater that 175 milli-volts ("mv") be detected as non-idle, and that a receiver differential voltage less than 65 mv be detected as idle. At PCIe first-generation speeds (i.e., 2.5 Gb/s), the differential signal lines of a high speed lane meet the above recited voltage differentials, and thus allow for reliable detection of the idle condition and the non-idle condition. Unfortunately, at second-generation speeds (i.e., 5 Gb/s) the signal lines of a high speed lane may achieve only a 120 mv differential. Thus, second generation signaling may not allow for reliable detection of electrical idle and/or electrical non-idle states. To overcome this deficiency, second generation PCIe systems transmit a series of symbols (i.e., electrical idle exit ordered sets) which exceed the 175 mv specification, allowing exit from idle to be detected. However, after transmission of the electrical idle exit ordered sets, the operation of the idle detection circuitry will be unreliable.

Recognizing both a non-idle condition and an idle condition are important in allowing PCIe physical layer control to quickly acquire or re-acquire bit and symbol lock of a received signal. However, second-generation PCIe includes no method of quickly and accurately identifying an idle condition, because the analog idle detection circuit can recognize second-generation data as noise. Instead, second generation systems rely on information decoded from the data stream in the Link Training and Status State Machine ("LTSSM") to control entry into idle mode. Such reliance on decoded data streams for control can potentially cause problems in transitioning between states, for example, if the decoded data is corrupt. Embodiments of the present disclosure include individually controllable filters on the output of the analog idle detector to identify entrance into and exit from electrical idle, thereby providing reliable transition into and out of idle states, and quick bit and symbol locking.

FIG. 1 shows a system 100 that includes devices employing PCIe with electrical idle and non-idle detection in accordance with various embodiments. The system of FIG. 1 includes a central processing unit ("CPU") 102, a memory bridge 104, also referred to as a north bridge, and an I/O bridge 106, also referred to as a south bridge. The CPU 102 can comprise any general-purpose processor, digital signal processor, microcontroller, etc. that executes software programming. Embodiments of the CPU 102 can include execution units (integer, floating-point, fixed-point, etc.), instruction decoding, registers, caches, input/output devices and interconnecting buses. The bus 120, sometimes referred to as a front-side bus, couples the CPU 120 to the memory bridge 120, and through the memory bridge 120, to at least some other system components.

The memory bridge 104 and I/O bridge 106 are sometimes referred to a chipset. Generally, they serve to couple the CPU 102 to other system components. While illustrated as separate devices, the memory bridge 104 and the I/O bridge 106 can be integrated into a single device or package. As shown, the memory bridge 102 couples the CPU 102 to memory 112 and graphics adapter 108. Memory 112 is a computer readable medium and can include various types of semiconductor memory (dynamic random access memory ("DRAM"), static random access memory ("SRAM"), etc.). The interface between the memory bridge 104 and the memory 112 preferably comprises a parallel bus, for example, a 32-bit or 64-bit data bus with multiplexed addresses and additional control signals, but no particular bus architecture is required.

The graphics adapter 108 provides visual displays for a user. Graphics can consume a large amount of bandwidth, therefore in the illustrated embodiment, a PCIe link 122 couples the graphics adapter 108 to the memory bridge 104. The link can comprise one or more lanes to provide the bandwidth necessary to transfer data to the graphics adapter 108.

The I/O bridge 106 provides interfaces for a variety of different devices. In at least some embodiments, the I/O bridge interfaces to a disk drive 116, a network adapter 114, and/or another PCIe peripheral 118. In some embodiments, a PCIe link 128 couples the I/O bridge 106 to the memory bridge 104 to provide adequate bandwidth for the high-speed peripherals (e.g., network adapter 114) coupled to the I/O bridge 106.

The disk drive 116 can be, for example, a magnetic or solid-state disk coupled to the I/O bridge 106 via a serial advanced technology attachment ("SATA") interface, a fiber channel interface, etc.

The network adapter 114 can be, for example, a 10 Gb/s Ethernet adapter coupled to the I/O bridge 106 by a PCIe link 124. Other PCIe enabled device, represented by, PCIe peripheral 118 are also connected to the I/O bridge 106 by a PCIe link 126.

Each of the described devices that provide a PCIe interface preferably supports first generation PCIe as well as later generations, such as second generation PCIe. Each PCIe compliant device also preferably includes an idle entry filter and an idle exit filter coupled to the analog idle detection circuitry of each PCIe lane differential receiver. The entry and exit filters provide reliable detection of the onset of and exit from electrical idle mode. Embodiments, thus avoid various difficulties, such as erroneous clock recovery and symbol lock that can result from incorrect idle stat determinations.

Figure 2:
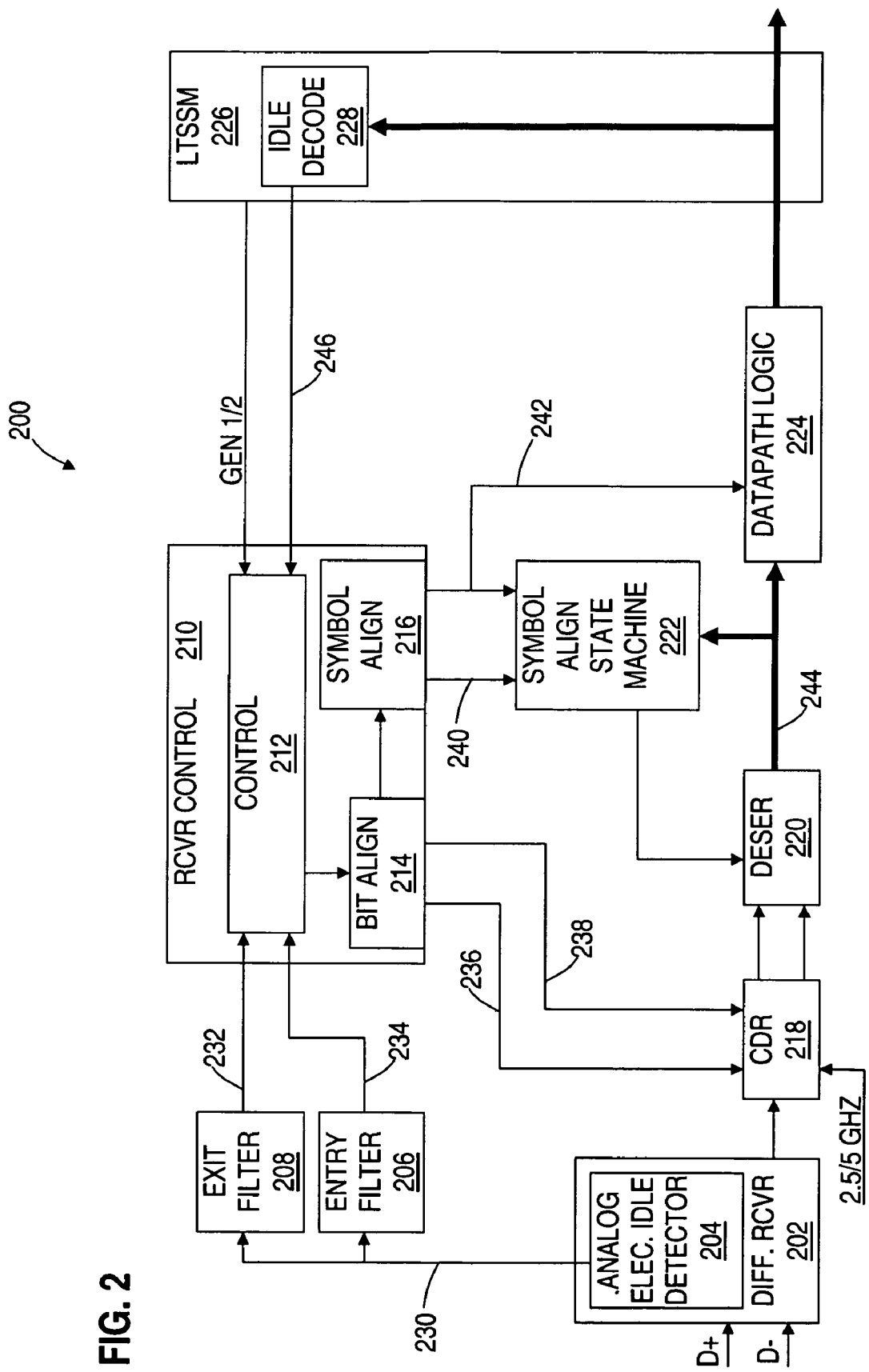
FIG. 2 shows an exemplary PCIe receiver including filters that detect electrical idle and/or non-idle states in accordance with various embodiments.

FIG. 2 shows an exemplary PCIe receiver 200 including filters 206, 208 that detect electrical idle and/or non-idle states in accordance with various embodiments. The receiver 200 comprises a differential receiver 202 for each lane. The differential receiver 202 detects the differences between the positive and negative signal lines (D+ and D−) to produce a ground referenced output serial bitstream. The differential receiver 202 comprises an analog electrical idle detector 204 to determine whether the received signals (D+ and D−) indicate an electrical idle condition. The analog electrical idle detector 204 continuously monitors the differential across the PCIe high-speed serial lane to determine whether there is any electrical activity. The requirements of the analog electrical idle detector 204 are specified in the PCI Express Specification available from the PCI Special Interest Group.

The differential receiver 202 provides a serial bitstream to the clock and data recovery module ("CDR") 218 that extracts a clock from the bitstream and applies the clock to the bitstream to generate a recovered bitstream. The extracted clock and recovered bitstream are provided to a deserializer (i.e., a serial to parallel converter) 220 where the bitstream is deserialized into multi-bit (i.e., 10-bit) symbols. The multi-bit symbols are provided to various datapath logic elements 224, the LTSSM 226, and the symbol alignment state machine 222 which controls symbol timing in the deserializer 220.

Proper detection of the idle state contributes to reducing receiver power consumption because at least some portions of the receiver are not needed and can be placed in a reduced power state when no data is being received. Furthermore, accurate idle state detection can prevent introduction of erroneous data into the various data handing components and allow for proper bit and symbol level synchronization.

An idle output 230 of the electrical idle detector 204 provides an indication of whether the electrical idle detector 204 has determined that an idle state is present on the lane inputs. Unfortunately, the signal 230 may not accurately reflect the state of the lane inputs, for example, when second generation data rates are in use. The idle mode entry filter 206 and the idle mode exit filter 208 monitor the output 230 of the analog electrical idle detector 204 and determine the state of the lane input based on the signal 230 maintaining an idle or non-idle state indication for a predetermined time interval.

Some embodiments of the receiver 200 operate differently, to identify idle/non-idle states, when operating at first generation speeds than when operating at later PCIe generation data rates. At first generation PCIe speeds, the analog idle detection circuit can function adequately, and accordingly the output 230 can accurately reflect the idle state of the lane input. At first generation data rates, the exit filter 208 is programmed to detect an exit from electrical idle when the signal 230 continuously indicates that the lane inputs are not idle for a predetermined period. In some embodiments, the predetermined period for idle mode exit can be set to 0-6 nanoseconds ("ns"). Embodiments of the idle entry filter 206 may be set to a longer duration for detection of entry into the electrical idle. For example, some embodiments of the entry filter 206 may apply a filter value of 14-30 ns to allow a data transmission or noise to settle. Embodiments are not limited to any particular filter values.

At second generation speeds, the PCI Express Specification stipulates that exit from electrical idle is provided by transmission of electrical idle exit ordered sets prior to transmission of training sets. The electrical idle exit ordered sets provide an appropriate lane input differential voltage by approximating first generation data transmission. After completion of the electrical idle exit ordered sets, the analog electrical idle detector 204 can erroneously identify second generation data transmissions as an electrical idle state. Thus, the analog electrical idle detector 204 cannot be relied on to detect the onset of the electrical idle state.

Embodiments of the present disclosure use the outputs 232, 234 of the filters 208, 206, and detection of electrical idle ordered sets in the idle decoder 228 of the LTSSM 226 to determine the idle state of the lane input. For second generation operation, the filter outputs 232, 234 and the LTSSM 226 idle decoder 228 output preferably match. Thus, to enter the electrical idle state when using second generation signaling, the LTSSM 226 preferably reports that it is in a state where it is no longer observing data (i.e., electrical idle ordered sets have been received) and the output 234 of the idle entry filter 206 indicates electrical idle.

The outputs 232, 234 of the idle mode exit filter 208 and the idle mode entry filter 206 are provided to receiver control logic 212. In conjunction with the electrical idle mode information 246 decoded from the received bitstream (i.e., decoded electrical idle ordered sets), control logic 212 orchestrates receiver activities, such as bit alignment, symbol alignment, etc. The receiver control logic 212 signals the bit alignment module 214 to indicate idle/non-idle states. In accordance with the idle/non-idle mode, the bit alignment module 214 provides start 236 and reset 238 signals to the CDR 218 causing the CDR 218 to properly align clock and data when the non-idle state is entered. In at least some embodiments, the CDR 218 is held reset when the lane inputs are in the electrical idle state.

Symbol alignment control 216 provides control to the symbol alignment state machine 222, and portions of the datapath logic 224 to insure provision and processing of properly aligned symbols. Symbol alignment preferably begins after the serial bitstream and extracted clock have been properly aligned in CDR 218, and bits are properly clocked into the deserializer 220. Symbol alignment control 216 provide start 240 and reset 242 signals to the symbol alignment state machine 222 to initiate symbol alignment after successful bit alignment. The symbol alignment state machine 222 can align symbols in the deserializer 220 base on recognized bit patterns, for example, coded patterns that cannot be produced by concatenation of adjacent multi-bit codes. Following symbol alignment, the deserializer 220 outputs properly aligned multi-bit symbols (e.g., aligned 10-bit symbols).

By accurately detecting electrical idle and non-idle states of the lane inputs, embodiments of the present disclosure insure proper bit and symbol alignment when transitioning from idle mode to non-idle mode, reduce instances of clock related problems during idle mode, and reduce receiver power consumption.

Figure 3:
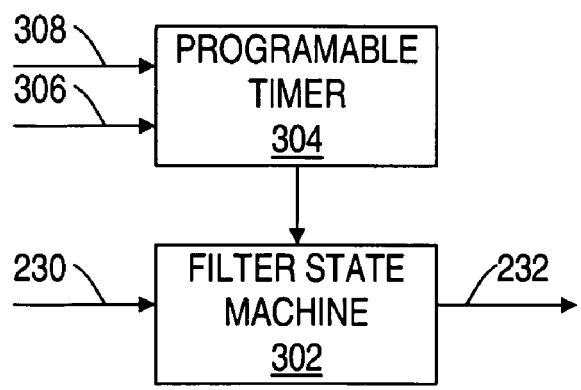
FIG. 3 shows an exemplary filter that detects electrical idle and/or non-idle states of a received PCIe signal in accordance with various embodiments.

FIG. 3 shows an exemplary filter 206, 208 that detects electrical idle and/or non-idle states of a received PCIe signal in accordance with various embodiments. The filter comprises a programmable timer 304 and a filter state machine 302. The filter state machine 302 monitors the output 230 of the analog electrical idle detector 204 and asserts an output signal 232, 234 when the idle detector 204 output 230 indicates a continuous idle or non-idle state for a time period defined by the programmable timer 304.

The programmable timer 304 uses clock input 306 as a time reference. In some embodiments the clock input 306 provides at least 1 ns timing resolution. A value 308 defining the timer 304 interval can be, for example, provided by the CPU 102, or read from a storage device coupled to the filter 206, 208. In some embodiments, the value 308 can be determined in accordance with the reliability of the analog electrical idle detector 204 in detecting an idle/non-idle lane input.

Figure 4:
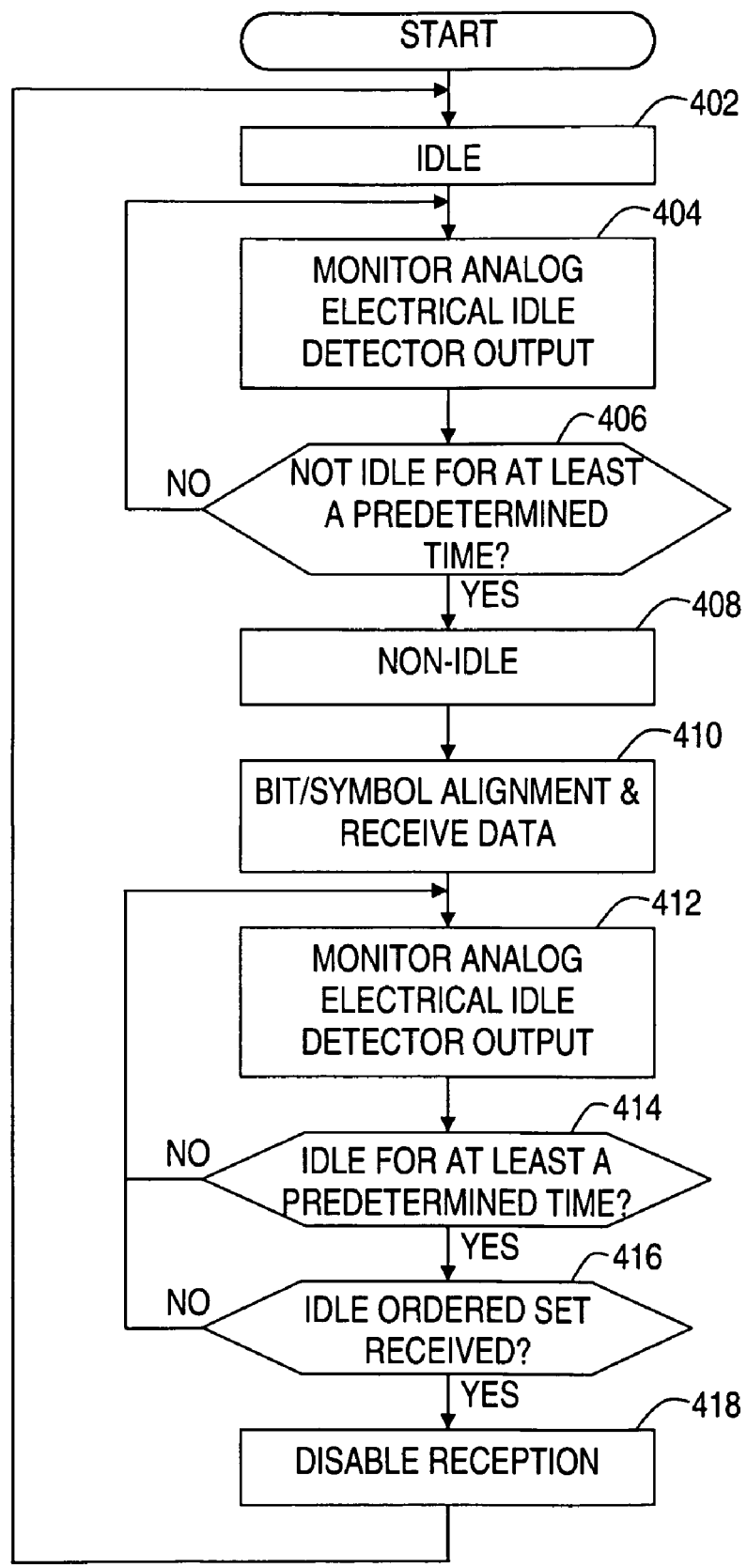
FIG. 4 shows a flow diagram for a method for controlling a receiver by detecting electrical idle and/or non-idle states of a received PCIe signal in accordance with various embodiments.

FIG. 4 shows a flow diagram for a method for controlling a receiver 200 by detecting electrical idle and/or non-idle states of a received PCIe signal in accordance with various embodiments. Though depicted sequentially as a matter of convenience, at least some of the actions shown can be performed in a different order and/or performed in parallel. Additionally, some embodiments may perform only some of the actions shown.

In block 402, lane inputs of the receiver 200 are in the electrical idle state. Accordingly, CDR 218 and symbol alignment state machine 222 are reset by bit alignment module 214 and symbol alignment module 216, respectively, to prevent erroneous clock and/or symbol generation and to reduce receiver power consumption.

In block 404, the electrical idle exit filter 208 is monitoring the output 230 of the analog electrical idle detector 204. The programmable timer 304 of the idle exit filter 208 is preferably programmed for a time interval adequate to reliably determine when the lane input has transitioned from idle mode to non-idle mode. In some embodiments, the programmable timer can be set in the range of 0-6 ns. Embodiments can also set the programmable timer to other values to, for example, facilitate electrical testing.

If, in block 406, the output 230 of the analog electrical idle detector 204 indicates the lane inputs are non-idle for at least the predetermined time period programmed into timer 304, the idle mode exit filter 208 asserts output 232. If the output 230 does not continuously indicate the lane inputs are non-idle for the prescribed interval, then monitoring continues in block 404.

Assertion of output 232 indicates that the lane inputs are active. Thus, in block 408, the differential serial inputs are non-idle. The output 232 is provided to the receiver control logic 210 that coordinates receiver operations. In block 410, the control logic 212 signals a non-idle condition to the bit alignment module 214, which in turn signals the CDR 218 to lock an extracted clock onto the received bitstream. After bit alignment is achieved, the symbol alignment module 216 signals the symbol alignment state machine 220 to align multi-bit symbols in the deserializer 220. With bit and symbol alignment completed, data can be received by higher levels of the receiver 200, for example LTSSM 226.

In block 412, the electrical idle entry filter 206 is monitoring the output 230 of the analog electrical idle detector 204. Additionally, in some embodiments, the idle decoder 228 of the LTSSM 226 is monitoring the multi-bit symbols 244 to identify electrical idle ordered sets because the electrical idle detector 204 cannot accurately determine idle entry with second generation signaling. The programmable timer 304 of the idle entry filter 206 is preferably programmed for a time interval adequate to reliably determine when the lane input has transitioned from non-idle mode to idle mode. In some embodiments, the programmable timer can be set in the range of 14-30 ns. Embodiments can also set the programmable timer to other values to, for example, facilitate electrical testing.

If the output 230 of the analog electrical idle detector 204 indicates the lane inputs are idle for at least the predetermined time period programmed into timer 304, the idle mode entry filter 206 asserts output 234. If the output 230 does not continuously indicate the lane inputs are idle for the prescribed interval, then monitoring continues in block 412.

Some embodiments base identification of entry into electrical idle mode on the output 234 of the idle entry filter 206, for example, when receiving first generation PCIe signaling. Some embodiments base identification of entry into electrical idle on both assertion of idle entry filter 206 output 234 and reception of electrical idle ordered sets in LTSSM 226 idle decoder 228 (e.g., when receiving second generation PCIe signaling). If, in block 416, the idle decoder 228, identifies electrical idle ordered sets in the symbol stream 244, then in conjunction with assertion of output 234 of the idle entry filter 206, the lane inputs are deemed to be in idle mode. Accordingly, data reception is disabled, in block 418, by receiver control logic 212 that, in at least some embodiments, causes bit and symbol alignment to reset pending exit from the electrical idle state.

The above discussion is meant to be illustrative of the principles and various embodiments of the present invention. Numerous variations and modifications will become apparent to those skilled in the art once the above disclosure is fully appreciated. For example, while embodiments have been described in relation the PCI Express receiver applications, those skilled in the art will understand that embodiments are applicable to variety of receiver applications using an analog electrical idle detector. It is intended that the following claims be interpreted to embrace all such variations and modifications.

What is claimed is:

1. A receiver, comprising:
a differential receiver that receives a variable rate differential signal;
an analog idle detector coupled to the differential receiver, the analog idle detector provides a first idle signal that erroneously identifies a differential signal electrical idle state;
a first filter coupled to the analog idle detector,
wherein the first filter processes the first idle signal and generates a second idle signal lacking an idle state error of the first idle signal, and the first filter provides the second idle signal to receiver control logic that controls signal reception.

2. The receiver of claim 1, wherein the first filter determines that the differential signal is idle when the first idle signal continuously indicates that the differential signal is idle for a first predetermined time interval, and the first predetermined time interval is programmable.

3. The receiver of claim 1, wherein the receiver control logic determines whether the differential signal transmitted at a first rate is idle based on the second idle signal and reception of information encoded in the differential signal indicating an impending idle condition.

4. The receiver of claim 1, wherein the first filter indicates that the differential signal is idle if the first idle signal continuously indicates that the differential signal is idle for not less than 14 nano-seconds.

5. The receiver of claim 1, further comprising a second filter coupled to the analog idle detector, wherein the second filter processes the first idle signal and generates a non-idle signal, the non-idle signal lacks a non-idle state error of the first idle signal; and the second filter provides the non-idle signal to receiver control logic that controls signal reception.

6. The receiver of claim 5, wherein the second filter determines that the differential signal is not idle when the first idle signal continuously indicates that the differential signal is not idle for a second predetermined time interval, and the second predetermined time interval is programmable.

7. The receiver of claim 5, wherein the receiver control logic determines whether the differential signal transmitted at a second rate is active based only the non-idle signal and determines whether the differential signal transmitted at the first rate is inactive base only on the second idle signal.

8. A method, comprising:
generating, in a differential receiver, a preliminary idle signal that incorrectly indicates a received differential signal is idle when the received signal is not idle;
processing the preliminary idle signal to provide a filtered idle signal that accurately indicates when the received signal has gone from a non-idle state to an idle state; and
providing the filtered idle signal to receiver control circuitry that inhibits data reception based, at least in part, on the filtered idle signal.

9. The method of claim 8, further comprising:
providing a preliminary non-idle signal that inaccurately indicates whether a received differential signal is not idle;
processing the preliminary non-idle signal to provide an accurate non-idle signal indicating that the received signal is not idle; and
providing the accurate signal to receiver control circuitry that initiates bit and symbol alignment based, at least in part, on the accurate non-idle signal.

10. The method of claim 8, further comprising:
decoding data in the received signal that indicates the received signal will transition from a non-idle state to an idle state; and
inhibiting data reception based, at least in part, on the decoded data and the accurate idle signal.

11. The method of claim 8, further comprising generating the accurate idle signal based on whether the preliminary idle signal continuously indicates that the received signal is idle for a first programmable time interval.

12. The method of claim 8, further comprising generating the accurate non-idle signal based on whether the preliminary non-idle signal continuously indicates that the received signal is not idle for a second programmable time interval.

13. A system, comprising:
a transmitting device comprising a differential transmitter;
a receiving device comprising:
a differential receiver that receives differential signals transmitted by the transmitting device;
an idle state entry filter that determines when the differential signal is in an electrical idle state;
an idle state exit filter that determines when the differential signal is in an electrically active state; and
receiver control logic that provides control to the receiving device based, at least in part, on the determinations of the idle detection filter and the activity detection filter.

14. The system of claim 13, wherein the idle state entry filter bases an idle state determination on whether the differential signal is inactive for a first predetermined programmable interval, and the idle state exit filter bases an active state determination on whether the differential signal is active for a second predetermined programmable interval.

15. The system of claim 13, further comprising a decoder that decodes data encoded in the differential signal; wherein the receiver control logic determines that the differential signal is idle based, at least in part, on an output of the idle state entry filter and data decoded from the differential signal.

* * * * *